June 6, 1967   J. W. DONNELLY   3,323,891
GLASS FORMING APPARATUS WITH SELF-ACCOMMODATING
AND UNIVERSAL PLUNGERS
Original Filed Nov. 17, 1964   2 Sheets-Sheet 1
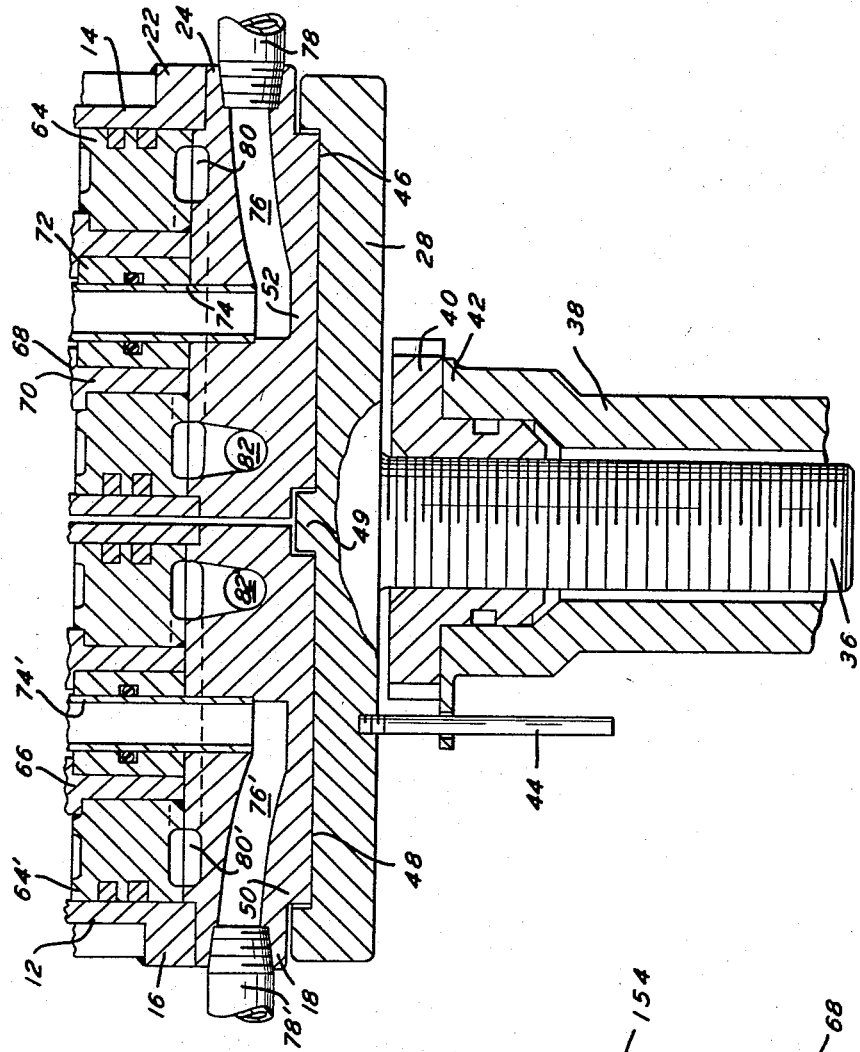
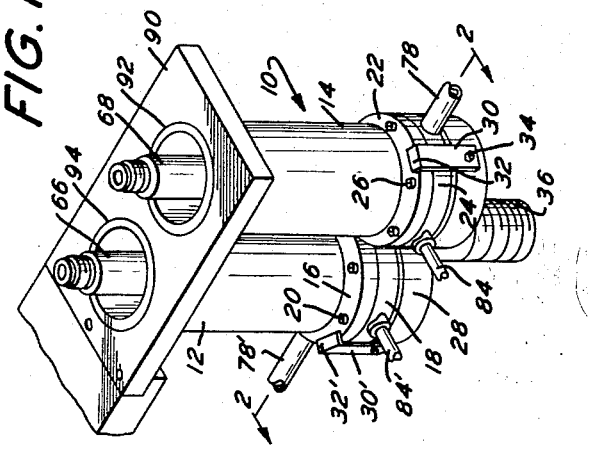
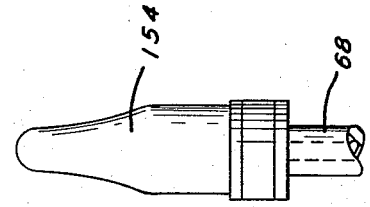
INVENTOR
JOSEPH W. DONNELLY
BY *Seidel & Gonda*
ATTORNEYS.

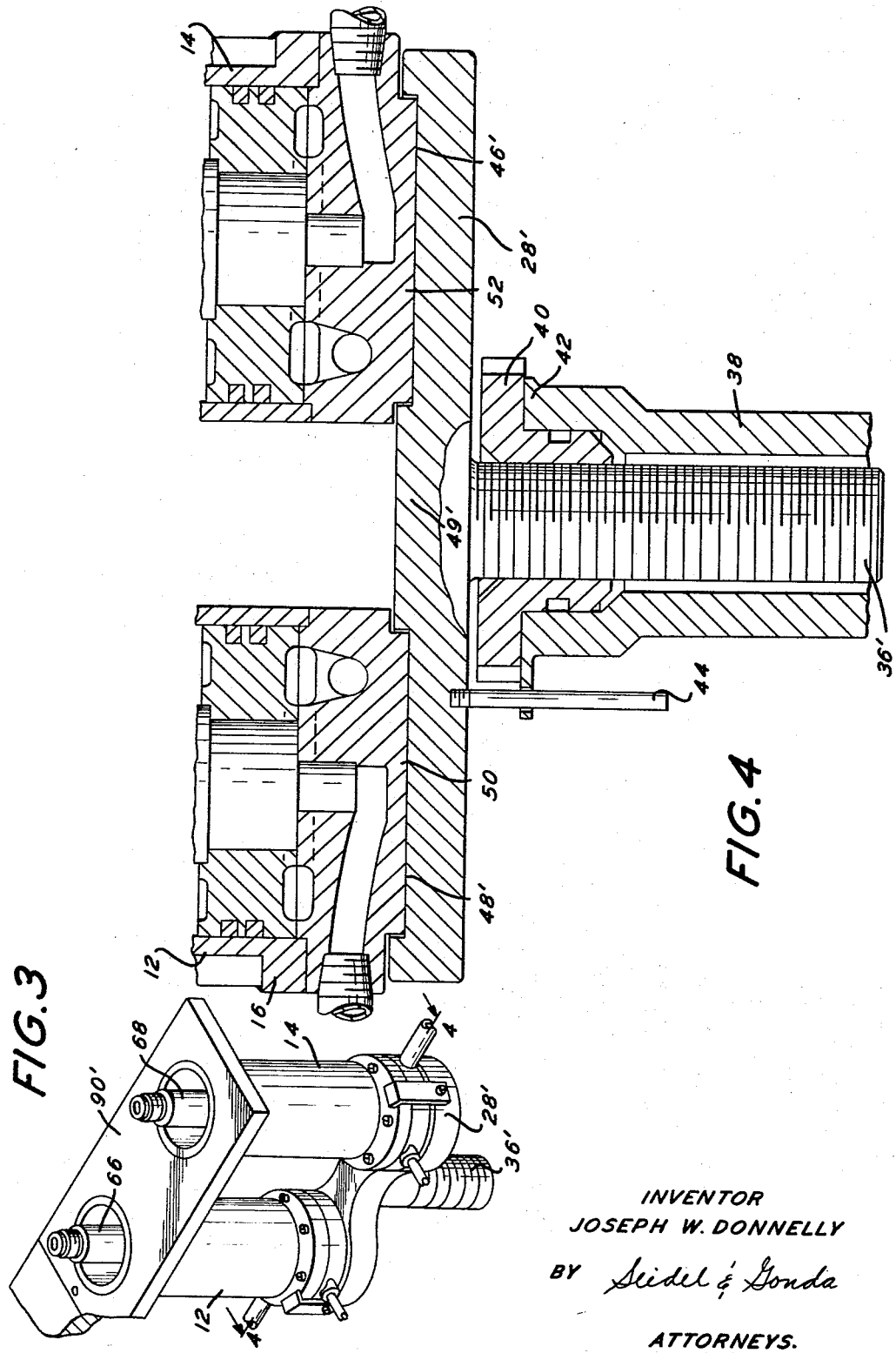

United States Patent Office 3,323,891
Patented June 6, 1967

3,323,891
GLASS FORMING APPARATUS WITH SELF-ACCOMMODATING AND UNIVERSAL PLUNGERS
Joseph W. Donnelly, Vineland, N.J., assignor to Maul Brothers Inc., Millville, N.J., a corporation of New Jersey
Continuation of application Ser. No. 411,889, Nov. 17, 1964. This application Aug. 17, 1966, Ser. No. 573,125
2 Claims. (Cl. 65—246)

This application is a continuation of application Ser. No. 411,889 filed Nov. 17, 1964, now abandoned, which is a continuation-in-part application of my copending application Ser. No. 51,829, filed Aug. 25, 1960, and entitled "Glass Forming Apparatus Having Self-Accommodating Plungers," now Patent No. 3,190,188.

The present invention relates to glass forming apparatus having self-accommodating and universal plungers.

This invention relates to glass forming apparatus having a pair of plunger casings which are "free floating" so that the plungers within the casings which form the glassware may be individually self-accommodating with respect to their respective molds. Also, the plungers in the present invention are universal in that they may be used regardless of the size of the mold cavity in the apparatus.

It has become increasingly popular in the glassware industry to utilize glass forming apparatus of the type wherein a plurality of plungers are provided in a single mechanism to simultaneously form a plurality of hollow glass parisons. An example of such apparatus is shown in U.S. Patent 2,508,891. The apparatus in said patent suffers from several defects, namely, the plungers are restricted to simultaneous movement, the plungers are not individually adjustable or self-accommodating with respect to their molds, and the plungers can only be used with one side of mold.

Due to manufacturing tolerances, the inherent defects in grain structures of materials, and wear due to use, the alignment of the various plungers with respect to their molds are all slightly different from one another. The present invention overcomes this problem by positioning the plungers in "free floating" cylinders capable of being adjusted vertically as a unit. In this manner, the optimum relationship between a plunger and a press-and-blow operation or a neck pin in a press-and-blow operation and the molds will be automatically attained.

In order to make different sized hollow glass articles, it has been necessary to provide a plurality of machines having different sized molds. The size of a particular parison will determine the shape and size of the final molded product. The present invention eliminates the need for providing different machines for making different sized articles. Different sized molds may be provided in the machine and the plungers mounted in such a fashion so as to be able to perform their pressing function in the molds. Hence, the apparatus of the present invention is rendered substantially universal.

It is an object of the present invention to provide a novel glass forming apparatus.

It is another object of the present invention to provide a novel glass forming apparatus having "free floating" casings vertically adjustable as a unit.

It is another object of the present invention to provide a novel glass forming apparatus having plungers individually self-accommodating with respect to their molds.

It is still another object of the present invention to provide a novel glass forming apparatus having a plurality of plungers each individually operable for the formation of glassware independent of the other plungers, which apparatus is simpler than the devices used heretofore.

It is a further object of the present invention to provide a novel glass forming apparatus of the plural cavity type capable of being vertically adjusted as a unit, wherein each casing may have rotary and spatial movement with respect to the other casing.

A still further object of this invention is to provide a novel glass forming apparatus having universal plungers.

It is another object of the present invention to provide a novel glass apparatus having universal plungers which can be used with various size molds which are adapted to be mounted in the apparatus so that different size hollow articles may be formed by the apparatus.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a perspective view of the plunger casings in a glass forming apparatus of the present invention.

FIGURE 2 is a partial sectional view taken along the line 2—2 of FIGURE 1.

FIGURE 3 is a perspective view of the plunger casings similar to FIGURE 1, but illustrating the plunger casings mounted on a different base plate so as to be able to be used with larger molds.

FIGURE 4 is a partial sectional view taken along the line 4—4 of FIGURE 3.

FIGURE 5 is an elevational view of a conventional press-and-blow plunger.

Referring to the drawings in detail, wherein like numerals indicate like elements, there is shown in FIGURE 1 a portion of the glass forming apparatus of the present invention, designated generally as 10.

The portion of the glass forming apparatus 10 comprises a pair of cylindrical casings 12 and 14. The cylindrical casing 12 is provided with an integral flange 16 which is fixedly secured to its base 18 by a plurality of bolts 20. The casing 14 is provided with an integral flange 22 which is fixedly secured to its base 24 by a plurality of bolts 26.

The base 18 and the base 24 of the casings 12 and 14 are supported upon a base plate 28. The base 24 is maintained juxtaposed to the base plate 28 by a mounting bracket 30. The mounting bracket 30 is provided with a flange 32 which extends over the upper surface of the flange 22 and the body of the bracket 30 is fixedly secured to the base plate 28 by a bolt 34. A similar mounting bracket 30' is provided for the casing 12. Since the bracket 30' is identical with the bracket 30, it need not be discussed in detail.

The base plate 28 is provided with a mounting post 36 which extends downwardly from the lower surface of the base plate 28, as seen more clearly in FIGURE 2. Mounting post 36 extends through a tubular sleeve 38. A gear 40 is supported on the flange 42 of the sleeve 38 and is provided with a central bore threaded through the outer periphery of the mounting post 36. The lower portion of the mounting post 36 is provided with threads adapted to cooperate with the gear 40 and structure well-known to those skilled in the art for adjusting the vertical position of the base plate 28. For example, such structure may be of the type shown in U.S. Patent 2,637,944. The actuating mechanism for the mounting post 36 will be of the non-rising type and a guide pin 44 is fixedly secured to the lower surface of the base plate 28 for cooperation with a flange on the sleeve 38 so as to prevent rotary movement of the base plate 28.

The base plate 28 is provided with a pair of spaced circular recesses 46 and 48 on its upper surface. The recesses 46 and 48 are spaced from one another by the ridge 49 on the upper surface of the base plate 28. The base plate 18 on the casing 12 is provided on its lowermost surface with an axially extending boss 50. The boss 50 has a height which is slightly greater than the depth of the recess 48 so that the base 18 is spaced from the upper surface of the base plate 28 by a short distance. The boss 50 is circular in transverse cross section and has transverse dimensions slightly smaller than the transverse dimensions of the recess 48.

The base 24 on the casing 14 is provided with a boss 52 which is identical with the boss 50. Since the boss 52 cooperates with the recess 46 in the same manner as the boss 50 cooperates with the recess 48, its dimensional relationship with the recess 46 need not be repeated.

Referring in detail to FIGURE 2, it will be noted that a piston 64 is disposed within the bore of the casing 14. A piston 64' is disposed within the bore of the casing 12. A piston rod 66 is fixedly secured to the piston 64' in any convenient manner such as welding. A piston rod 68 is fixedly secured to the piston 64 in a like manner. Since the construction of the casings 12 and 14 and the elements disposed therein are identical, it is deemed sufficient to only describe these elements within one casing. Thus, only the elements within casing 14 will be described in detail, and the corresponding elements within casing 12 will be shown with the identical numerals which are primed.

As shown more clearly in the righthand portion of FIGURE 2, the piston rod 68 is hollow and is provided with a tubular extension 70. A sleeve-like bushing 72 is disposed within the tubular extension 70 and is fixedly secured thereto. A hollow tube 74 is fixedly secured at one end to the base 24 and extends upwardly through the bushing 72 and the piston rod 68. The hollow tube 74 is in communication at its lower end with a passage 76 in the base 24. A conduit 78 is threadedly engaged with the base 24 and is in communication with the passage 76. The conduit 78 is adapted to be connected with a source of cool dry air under pressure for cooling the plungers adapted to be mounted on the piston rods 66 and 68 as is well-known in the art.

The upper surface of the base 24 is provided with an annular groove 80. The lower surface of the piston 64 is provided with a mating groove. As shown more clearly in FIGURE 1, the passage 82 is in communication with a conduit 84 which supplies pressurized fluid for causing the piston 74 to reciprocate in a vertical direction. The valve mechanism for effecting the admittance of pressurized fluid through the conduit 84 is described in detail in my copending application Ser. No. 51,829, now Patent No. 3,190,188.

It will thus be apparent that the pistons 64 and 64' are individually actuatable. Mounted on the end of each of the piston rods 66, 68, is a plunger 154. The plunger 154 is adapted to be moved to a glass forming position within a mold.

The relationship between the casings 12, 14 and the base plate 28 enables the plunger 154 to be self-accommodating with respect to its mold. The casings 12 and 14 are "free floating" with respect to each other and the base plate 28. So that the plungers on the piston rods 66 and 68 may be self-accommodating with respect to their molds and have rotary as well as spatial relative movement. The difference in transverse dimensions between the bosses 50 and 52 with relation to the recesses 46 and 48 permits spatial relative movement. Further, the bosses 50 and 52 are adapted to rotate in their respective mounting recesses. The mounting brackets 30 and 30' do not interfere with the rotary or spatial movement of the casings 12 and 14 since the flanges 32 and 32' are spaced from the upper surface on the flanges 16 and 22. The flanges 32 and 32' prevent the casings 12 and 14 from moving vertically in the event that the plungers become stuck to the parison.

The casings 12 and 14 are movable vertically as a unit by the mounting post 36 which is fixedly secured to the lower surface of the base plate 28. Thus, it will be seen that the casings 12 and 14 have rotary and spatial movement as well as vertical reciprocation as a unit. In this manner, the optimum relationship between a plunger and a press-and-blow operation or a neck pin in a press-and-blow operation and the molds will be automatically attained. At the same time, the pistons 64 and 64' are each individually operable independent of the other so that the apparatus 10 of the present invention may be utilized as a single or a plural cavity mechanism.

Conduits (not shown) will be provided for delivering pressurized fluid to the space above the pistons 64 and 64' for positively biasing the pistons 64 and 64' to the position shown in FIGURE 2. An additional support arm 90 may be provided having circular recesses 92 and 94 for each of the casings 12 and 14. The recesses 92 and 94 are spaced apart in the manner corresponding to the spacing of the recesses 46 and 48 in the base plate.

With specific reference now to FIGURES 3 and 4, it will be observed that the casings 12 and 14 can be universally employed in the glassware forming apparatus. If it is desired to form larger parisons, in order to form larger glassware as the end product, a base plate 28' can be substituted for the base plate 28. The base plate 28' includes a mounting post 36' which is provided with threads adapted to cooperate with the gear 40 in the same manner as the mounting post 36. The only difference between the base plates 28 and 28' is that the recesses 46' and 48' in the base plate 28' are spaced apart a different distance than the recesses 46 and 48 on the base plate 28. The size of the recesses 46' are identical to the recesses 46 and 48 and cooperate with the bosses 50 and 52 in an identical manner. However, when the casings 12 and 14 are mounted upon the base plate 28', their longitudinal axes are spaced at a greater distance than when the casings were mounted upon the base plate 28. When forming larger parisons, different molds are provided whose longitudinal axes are spaced apart a greater distance. This is necessary since the material between the molding cavities in glass molds must be substantially uniform for all parison sizes so as to prevent heat transfer between the molding cavities and present a sufficient surface area for dissipating heat generated within the molding cavities.

The casing 12 and 14 are adapted to be shifted laterally with respect to each other and also rotate with respect to each other when mounted on the base plate 28'.

Since the molding cavities provided for forming a larger parison have longitudinal axes which are spaced further apart than those molding cavities which form smaller parisons, the base plate 28' is made to conform to the different spacing of the longitudinal axes of the molds. Hence, when seeking to form different size parisons in the glass forming apparatus, it is only necessary to change the molds, the casing support apparatus, and the plungers 154. The axes of the base plate and the molds should coincide and of course a different size plunger 154 can be screwed upon the piston rods 66 and 68.

In this manner, the cylindrical casing 12 and 14 comprising the major portion of the plunger mechanisms are rendered universal.

The present invention may be embodied in other specific forms without departing from the spirit or essential attributes thereof and, accordingly, reference should be made to the appended claims, rather than to the foregoing specification as indicating the scope of the invention.

It is claimed:

1. In an apparatus for forming glassware comprising first and second interchangeable substantially planar base plates, a pair of separate spaced guides on the upper surface of each base plate, the distance between the guides on the first plate being greater than the corresponding distance on the second plate, a pair of separate casings each supported on one of said guides, said casings being upright and parallel to one another with their longitudinal axes substantially perpendicular to the plane of their base plate, a piston rod reciprocally disposed within each casings, means connected to each casing for introducing fluid into the casings to actuate the piston rods, means connected to a central portion of each base plate for moving the base plate in a direction substantially parallel to the longitudinal axes of said casings, first and second interchangeable substantially planar arms, each arm having a pair of spaced apertures, the distance between the apertures on the first arm spaced apart by a distance greater than the corresponding distance on the second arm, means for supporting each arm above said casing with each of the apertures aligned with one of the casings, each casing having its upper end guided by one of the apertures in one of the arms, whereby one arm and one base plate form a set of interchangeable elements to be used simultaneously for positioning the casings and thereby facilitate changing from manufacture of glassware from one size to another.

2. Apparatus in accordance with claim 1 wherein each guide being a recess on the base plates, a portion of each casing has a transverse dimension slightly less than the corresponding transverse dimension of its mating recess on each base plate, said casing portions being received within said recesses to enable the longitudinal axis of one casing to be adjusted toward and away from the longitudinal axis of the other casing mounted on the base plate.

References Cited
UNITED STATES PATENTS

| | | | |
|---|---|---|---|
| 1,611,363 | 12/1926 | O'Neil | 65—361 X |
| 2,309,378 | 1/1943 | Berthold | 65—243 |
| 2,508,240 | 5/1950 | Fenn | 254—89 |
| 2,508,891 | 5/1950 | Rowe | 65—243 |
| 2,702,444 | 2/1955 | Rowe | 65—167 |
| 3,190,188 | 6/1965 | Connelly. | |

DONALL H. SYLVESTER, *Primary Examiner.*

M. W. MIGA, *Assistant Examiner.*

UNITED STATES PATENT OFFICE
CERTIFICATE OF CORRECTION

Patent No. 3,323,891                              June 6, 1967

Joseph W. Donnelly

It is certified that error appears in the above identified patent and that said Letters Patent are hereby corrected as shown below:

Column 1, line 23, "plungers" should read -- plunger mechanisms --. Column 2, line 7, "plungers" should read -- plunger mechanisms --.

Signed and sealed this 30th day of December 1969.

(SEAL)
Attest:

Edward M. Fletcher, Jr.                        WILLIAM E. SCHUYLER, JR.
Attesting Officer                                    Commissioner of Patents